(12) United States Patent
Goi

(10) Patent No.: US 9,874,697 B1
(45) Date of Patent: Jan. 23, 2018

(54) POLARIZATION-MAINTAINING OPTICAL FIBER AND BIDIRECTIONAL OPTICAL TRANSMISSION APPARATUS

(71) Applicant: Fujikura Ltd., Tokyo (JP)

(72) Inventor: Kazuhiro Goi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/446,510

(22) Filed: Mar. 1, 2017

(30) Foreign Application Priority Data

Nov. 16, 2016 (JP) ................................. 2016-223444

(51) Int. Cl.
| | | |
|---|---|---|
| G02B 6/00 | (2006.01) | |
| G02B 6/27 | (2006.01) | |
| G02B 6/42 | (2006.01) | |
| G02F 1/01 | (2006.01) | |

(52) U.S. Cl.
CPC ......... *G02B 6/2793* (2013.01); *G02B 6/2726* (2013.01); *G02B 6/2733* (2013.01); *G02B 6/2766* (2013.01); *G02B 6/2773* (2013.01); *G02B 6/4213* (2013.01); *G02B 6/4216* (2013.01); *G02B 6/4246* (2013.01); *G02F 1/0134* (2013.01)

(58) Field of Classification Search
CPC .. G02B 6/2793; G02B 6/2726; G02B 6/2773; G02B 6/4213; G02B 6/4246; G02B 6/2766; G02B 6/2733; G02B 6/4216; G02F 1/0134
See application file for complete search history.

(56) References Cited

U.S. PATENT DOCUMENTS

| | | | | |
|---|---|---|---|---|
| 5,260,768 | A * | 11/1993 | Cordova | G01C 19/721 356/460 |
| 9,372,314 | B2 * | 6/2016 | Furuya | G02B 6/424 |
| 9,470,847 | B2 * | 10/2016 | Grinderslev | G02B 6/3812 |
| 2006/0018603 | A1 * | 1/2006 | Greub | G02B 6/3812 385/60 |
| 2012/0263197 | A1 * | 10/2012 | Koplow | G02B 6/274 372/6 |
| 2013/0266279 | A1 * | 10/2013 | Nishioka | G02B 6/3851 385/99 |
| 2016/0018674 | A1 * | 1/2016 | Banaei | G02F 1/065 398/38 |

FOREIGN PATENT DOCUMENTS

| | | |
|---|---|---|
| EP | 3009869 A1 | 4/2016 |
| JP | 62-3205 A | 1/1987 |
| WO | 2014/207949 A1 | 12/2014 |

* cited by examiner

*Primary Examiner* — Ellen Kim
(74) *Attorney, Agent, or Firm* — Westerman, Hattori, Daniels & Adrian, LLP

(57) ABSTRACT

A bidirectional optical transmission apparatus includes a first optical waveguide device, a second optical waveguide device, and a polarization-maintaining optical fiber that connects the first optical waveguide device and the second optical waveguide device. A direction of a slow axis of the polarization-maintaining optical fiber with respect to a first substrate at a connecting portion between the first optical waveguide device and the polarization-maintaining optical fiber and a direction of the slow axis of the polarization-maintaining optical fiber with respect to the second substrate at a connecting portion between the second optical waveguide device and the polarization-maintaining optical fiber are substantially orthogonal to each other.

5 Claims, 8 Drawing Sheets

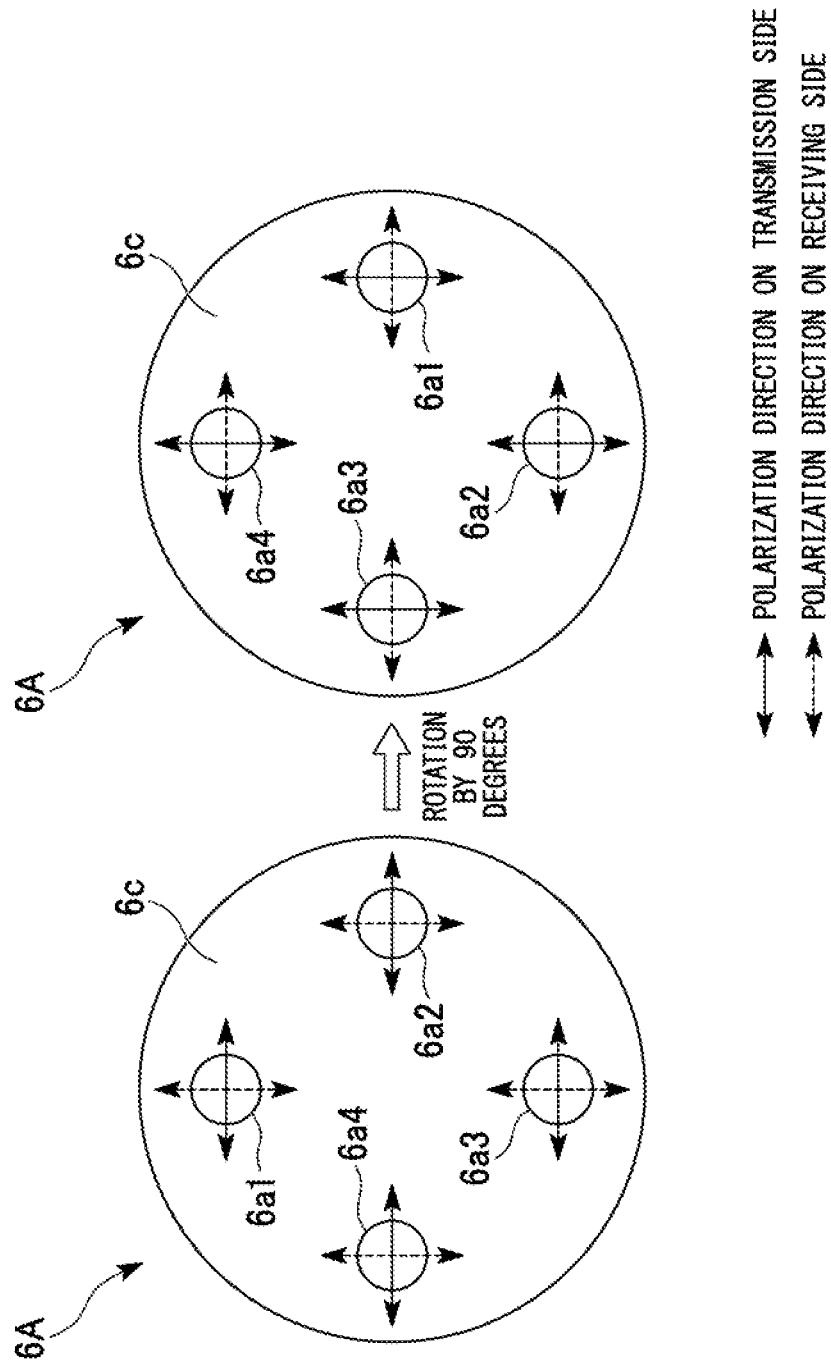

POLARIZATION-MAINTAINING OPTICAL FIBER AND BIDIRECTIONAL OPTICAL TRANSMISSION APPARATUS

BACKGROUND OF THE INVENTION

Field of the Invention

The present invention relates to a polarization-maintaining optical fiber and a bidirectional optical transmission apparatus.

Priority is claimed on Japanese Patent Application No. 2016-223444, filed on Nov. 16, 2016, the content of which is incorporated herein by reference.

Description of Related Art

Hitherto, a bidirectional optical transmission apparatus as disclosed in Japanese Unexamined Patent Application, First Publication No. S62-3205 has been known. This bidirectional optical transmission apparatus includes a first transmission and receiving unit, a second transmission and receiving unit, and a polarization-maintaining optical fiber. The first transmission and receiving unit includes a first optical transmission unit, a first optical receiving unit, and a first polarization coupler/splitter unit. The first polarization coupler/splitter unit is connected to the first optical transmission unit and the first optical receiving unit, and combines and splits a light wave in a different polarization state. The second transmission and receiving unit includes a second optical transmission unit, a second optical receiving unit, and a second polarization coupler/splitter unit. The second polarization coupler/splitter unit is connected to the second optical transmission unit and the second optical receiving unit, and combines and splits a light wave in a different polarization state. The polarization-maintaining optical fiber connects the first polarization coupler/splitter unit and the second polarization coupler/splitter unit.

In this bidirectional optical transmission apparatus, it is disclosed that the directions of the electric field planes of two light waves that bidirectionally pass through one polarization-maintaining optical fiber are caused to be orthogonal to each other. In addition, in order to cause the directions of the electric field planes of two light waves passing through one polarization-maintaining optical fiber to be orthogonal to each other in this manner, the first optical transmission unit and the second optical transmission unit launch light waves, the electric field planes of which are orthogonal to each other. Such a configuration is adopted, and thus it is possible to reduce crosstalk of the two light waves.

SUMMARY OF THE INVENTION

In this type of bidirectional optical transmission apparatus, an optical waveguide device may be used in which a transmission and receiving unit is configured to be disposed on a substrate. Here, in the bidirectional optical transmission apparatus disclosed in Japanese Unexamined Patent Application, First Publication No. S62-3205, the directions of the electric field planes of light waves which are launched by the first optical transmission unit and the second optical transmission unit with respect to the substrate are different from each other. Similarly, the directions of the electric field planes of light waves capable of being received by the first optical receiving unit and the second optical receiving unit are different from each other. Therefore, it is necessary to prepare different types of optical waveguide devices in the first transmission and receiving unit and the second transmission and receiving unit.

In this manner, using two transmission and receiving units having different types which form a pair leads to an increase in cost during the manufacturing of a bidirectional optical transmission apparatus or a decrease in its maintenance.

The present invention is contrived in view of such circumstances, and an object thereof is to commonalize configurations of a pair of transmission and receiving units which are used in a bidirectional optical transmission apparatus.

According to a first aspect of the present invention, there is provided a bidirectional optical transmission apparatus including: a first optical waveguide device which includes a first transmission and receiving unit that includes at least a first optical transmission unit, a first optical receiving unit, and a first polarization coupler/splitter unit, the first polarization coupler/splitter unit being connected to the first optical transmission unit and the first optical receiving unit, the first polarization coupler/splitter unit being configured to couple and split a light wave in a different polarization state, the first transmission and receiving unit being disposed on a first substrate; a second optical waveguide device which comprises a second transmission and receiving unit that includes at least a second optical transmission unit, a second optical receiving unit, and a second polarization coupler/splitter unit, the second polarization coupler/splitter unit being connected to the second optical transmission unit and the second optical receiving unit, the second polarization coupler/splitter unit being configured to couple and split a light wave in a different polarization state, the second transmission and receiving unit being disposed on a second substrate; and a polarization-maintaining optical fiber that connects the first optical waveguide device and the second optical waveguide device, wherein a direction of a slow axis of the polarization-maintaining optical fiber with respect to the first substrate at a connecting portion to the first optical waveguide device and a direction of the slow axis of the polarization-maintaining optical fiber with respect to the second substrate at a connecting portion to the second optical waveguide device are substantially orthogonal to each other.

In the bidirectional optical transmission apparatus according to the above aspect, the polarization-maintaining optical fiber may be axially twisted between the first optical waveguide device and the second optical waveguide device.

Furthermore, the polarization-maintaining optical fiber may include a polarization rotation element which is disposed on one end of the polarization-maintaining optical fiber, and which is configured to rotate in a direction of an electric field plane of the light wave.

The bidirectional optical transmission apparatus according to the above aspect may further include a plurality of the polarization-maintaining optical fibers, the first optical waveguide device may include at least a plurality of the first transmission and receiving units disposed on the first substrate, the second optical waveguide device may include at least a plurality of the second transmission and receiving units disposed on the second substrate, and the plurality of polarization-maintaining optical fibers may separately connect the plurality of the first transmission and receiving units and the plurality of the second transmission and receiving units, and the plurality of polarization-maintaining optical fibers are integrated in parallel with each other.

According to a second aspect of the present invention, there is provided a polarization-maintaining optical fiber including: a first end which is connected to a first optical waveguide device; a second end which is connected to a second optical waveguide device; a polarization rotation unit that changes a direction of an electric field plane of a light wave; a first connector key that regulates a direction of a slow axis of the polarization-maintaining optical fiber on the first end with respect to the first optical waveguide device; a second connector key that regulates a direction of a slow axis of the polarization-maintaining optical fiber on the second end with respect to the second optical waveguide device, in a direction which is substantially orthogonal to the direction of the slow axis of the polarization-maintaining optical fiber on the first end with respect to the first optical waveguide device, wherein a direction of an electric field plane of a light wave which is launched from the polarization rotation unit is substantially orthogonal to a direction of an electric field plane of a light wave incident on the polarization rotation unit.

According to the above aspect of the present invention, it is possible to commonalize the configurations of a pair of transmission and receiving units that are used in the bidirectional optical transmission apparatus.

BRIEF DESCRIPTION OF THE DRAWINGS

FIG. 8 is a diagram showing a configuration example in a case where a polarization-maintaining multicore optical fiber is used in the present embodiment.

DETAILED DESCRIPTION OF THE INVENTION

First Embodiment

The configuration of a bidirectional optical transmission apparatus according to a first embodiment will be described below with reference to FIG. 1.

Figure 1:
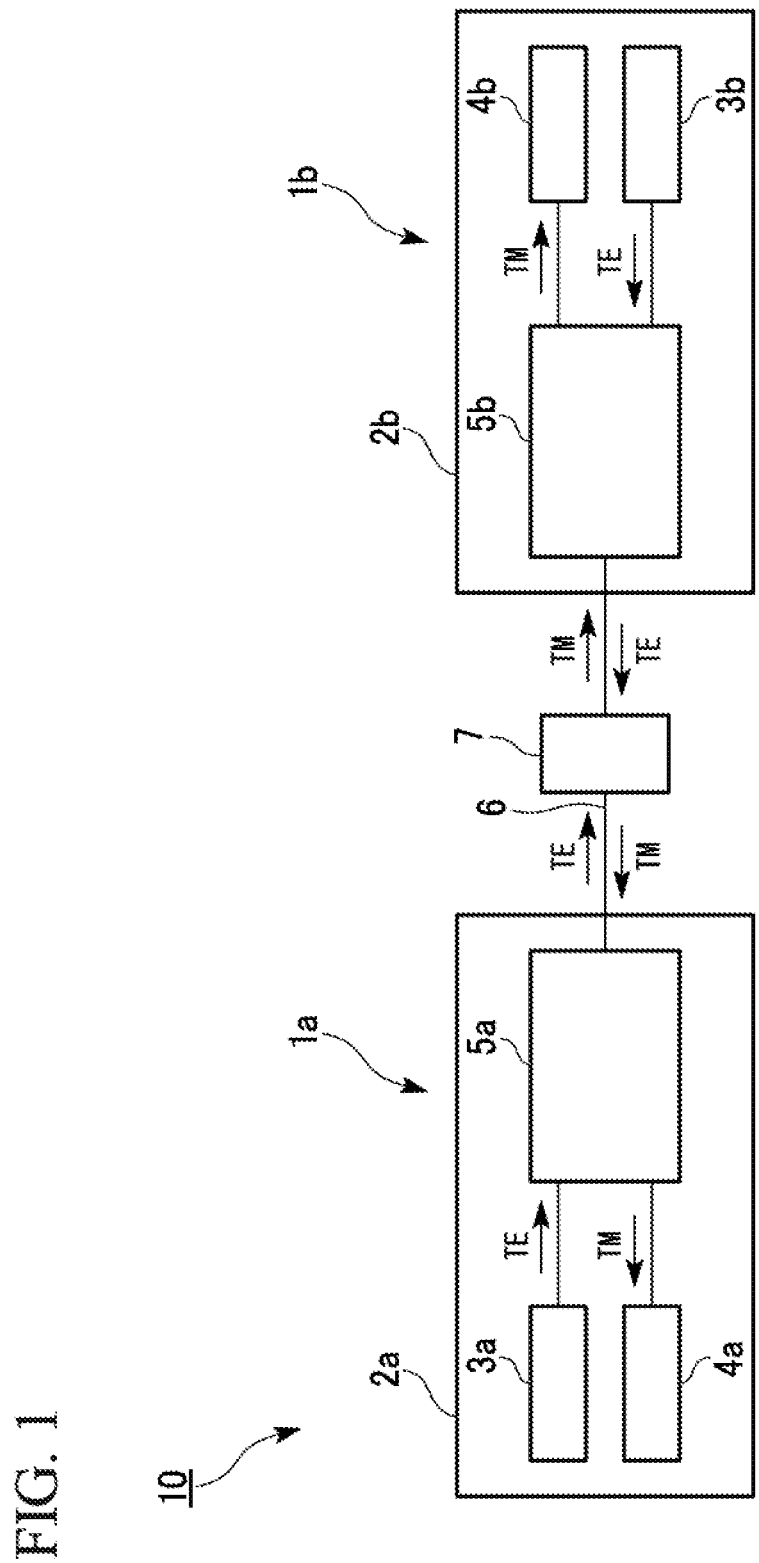
FIG. 1 is a diagram showing a configuration of a bidirectional optical transmission apparatus according to a first embodiment.

As shown in FIG. 1, a bidirectional optical transmission apparatus 10 includes an optical waveguide device (first optical waveguide device) 1a, an optical waveguide device (second optical waveguide device) 1b, and a polarization-maintaining optical fiber 6.

In addition, as shown in FIG. 1, the optical waveguide device (planar optical waveguide device) 1a includes a substrate (first substrate) 2a, an optical transmission unit (first optical transmission unit) 3a, an optical receiving unit (first optical receiving unit) 4a, and a polarization coupler/splitter unit (first polarization coupler/splitter unit) 5a. The optical waveguide device (planer optical waveguide device) 1b includes a substrate (second substrate) 2b, an optical transmission unit (second optical transmission unit) 3b, an optical receiving unit (second optical receiving unit) 4b, and a polarization coupler/splitter unit (second polarization coupler/splitter unit) 5b.

An example of the optical waveguide devices 1a and 1b includes, for example, an element using a silicon on insulator (SOI) substrate. In addition, an optical waveguide may be formed on an indium phosphorus (InP) substrate.

In a case where a SOI substrate is used as the optical waveguide devices 1a and 1b, the substrates 2a and 2b, formed of undoped Si, which have a flat surface are used. It is possible to fabricate a Si waveguide constituted by a lower cladding which is a buried oxide (BOX) layer formed of $SiO_2$ (not shown) having a thickness of, for example, approximately 3 μm on the substrates 2a and 2b, a core of Si fabricated thereon by a SOI layer, and an upper cladding formed thereon of, for example, $SiO_2$.

Here, the substrates 2a and 2b have the same substrate used therein, but the substrates 2a and 2b may have substrates different from each other used therein, without being limited thereto.

The Si waveguide constitutes respective element devices such as a directional coupler using a rectangular waveguide and a rib-type waveguide as a basic structure, and is configured such that the respective element devices are connected to each other on the substrates 2a and 2b. Thereby, an integrated device can be formed on one chip (one element).

As an example of the optical transmission units 3a and 3b, for example, laser diode (LD) constituted of an indium phosphorus (InP)-based material may be used.

The optical transmission units 3a and 3b are mounted on the substrates 2a and 2b, respectively. In a case where InP-based LD is used as the optical transmission units 3a and 3b, silicon which is a non-emission device with an indirect transition-type bandgap can be used as a waveguide, and also, optical components required for transmission and reception can be integrated on one chip.

The optical transmission units 3a and 3b launch a polarized light wave. In shown example, the optical transmission units 3a and 3b launch a polarized light wave of TE mode. The direction of a main electric field of the TE mode is parallel to the flat surfaces of the substrates 2a and 2b.

In addition, in a case where a LD is used as the optical transmission units 3a and 3b, a mode converter can also be used in a connecting portion between the LD and the optical waveguide in order to adapt a large mode field diameter of the LD. Thereby, it is possible to reduce loss.

Meanwhile, the optical transmission units 3a and 3b may not be mounted on the substrates 2a and 2b, and a LD may be disposed, for example, outside the substrates 2a and 2b to input light from this LD to the substrates 2a and 2b. In this case, each input terminal disposed on the substrates 2a and 2b can be regarded as the optical transmission units 3a and 3b.

Meanwhile, from the viewpoint of commonalization, in a case where a LD is disposed outside of the optical waveguide device 1a, it is preferable that a LD is also disposed outside the optical waveguide device 1b.

Here, in the present embodiment, the TE mode indicates a mode in which a main electric field is horizontal to the substrates 2a and 2b in the optical waveguide devices 1a and 1b. In addition, in the present embodiment, the TM mode indicates a mode in which a main electric field is vertical to the substrates 2a and 2b in the optical waveguide devices 1a and 1b. Meanwhile, the TE mode indicates a mode in which an electric field is present strictly in only a vertical direction to the traveling direction of light, and is not a strict TE mode in the optical waveguide devices 1a and 1b, but this is also defined as a TE mode in the present embodiment.

The directions of main electric fields in two modes of TE and TM are orthogonal (substantially orthogonal) to each other. Therefore, the polarization-maintaining optical fiber 6 and the polarization coupler/splitter units 5a and 5b can be connected to each other so that a first end of both ends of the polarization-maintaining optical fiber 6 is adapted to a slow axis direction of the polarization-maintaining optical fiber 6 and a second end thereof is adapted to a fast axis direction orthogonal (substantially orthogonal) to the slow axis.

Here, in connecting portions between the polarization-maintaining optical fiber 6 and the polarization coupling/splitting units 5a and 5b, it is preferable that an angle between the direction of a main electric field in the TE mode and the direction of the slow axis or fast axis of the polarization-maintaining optical fiber 6 is 0 degrees. However, the angle is not limited to 0°, and may have a deviation within a range in which the bidirectional optical transmission apparatus 10 functions normally. For example, it is preferable that the angle is equal to or greater than −10° and equal to or less than +10°.

Meanwhile, the wording "substantially orthogonal" in the present embodiment refers to a range in which light waves normally function as the TE mode or the TM mode when the waves are transmitted into the optical waveguide devices 1a and 1b. That is, the wording "substantially orthogonal" is not a concept indicating 90° strictly, and may indicate a range of, for example, 90°±10°.

In addition, a modulator (not shown in the figures) may be provided in order to convert electronic data into light. This modulator can be disposed directly to the optical transmission units 3a and 3b, or between the optical transmission units 3a and 3b and the polarization coupler/splitter units 5a and 5b.

For example, an optical ring resonator or a Mach-Zehnder optical modulator, which is capable of being mounted on the substrates 2a and 2b, may be used as the modulator. Particularly, a modulator using a carrier plasma effect may be used as an example of the modulator appropriate to high-speed operation. In this case, using the point that Si is a semiconductor, a pn junction is formed by ion implantation, and the concentration of carriers is changed by applying a voltage, thereby allowing the phase of light propagating through the modulator to be modulated. Such a modulator is normally designed so as to be adapted to one mode within waveguide modes having two orthogonal polarized light beams of a waveguide, and is required to change its design in order to correspond to a different polarization plane.

For example, a photo detector (PD) element may be used as the optical receiving units 4a and 4b. In addition, GePD obtained by growing germanium (Ge) on the substrates 2a and 2b may be used as the optical receiving units 4a and 4b. There are some kinds of PD those can simultaneously receive both TE mode and TM mode, but those PD normally exhibits different characteristics with respect to TE mode and TM mode. Therefore, it is preferable to adopt a PD adapted to any one of polarized TE modes or polarized TM modes, in accordance with which polarized TE modes and polarized TM modes received, such as to maximize the receiving sensitivity of a polarized mode.

The optical receiving units 4a and 4b are mounted on the substrates 2a and 2b, respectively.

Meanwhile, the optical receiving units 4a and 4b may be mounted outside the substrates 2a and 2b, instead of being mounted on the substrates 2a and 2b, and thus can also receive light outside the substrates 2a and 2b. In this case, an output terminal on a substrate from which an optical signal is output to the outside can be regarded as an optical receiving unit.

Meanwhile, from the viewpoint of commonalization, in a case where a PD or the like is disposed outside the optical waveguide device 1a, it is preferable that a PD or the like is also disposed outside the optical waveguide device 1b.

The polarization coupler/splitter units 5a and 5b can combine and split a light wave in a different polarization state. The polarization coupler/splitter unit 5a is connected to the optical transmission unit 3a and the optical receiving unit 4a by an optical waveguide. The polarization coupler/splitter unit 5b is connected to the optical transmission unit 3b and the optical receiving unit 4b by an optical waveguide. For example, a directional coupler can be used in the polarization coupler/splitter units 5a and 5b.

In the directional coupler, it is possible to selectively transition only one polarized wave with a different bit length, using the point that there is an effective refractive index difference between the TE mode and the TM mode of the waveguide.

Figure 2:
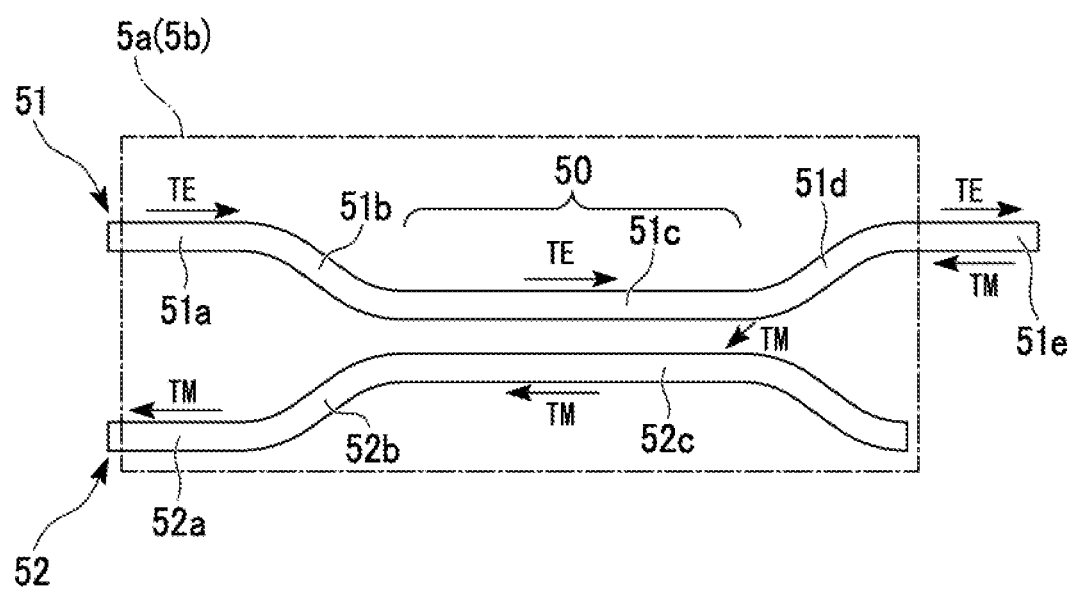
FIG. 2 is a diagram showing a configuration of a polarization coupler/splitter unit of FIG. 1.

FIG. 2 is a conceptual diagram in a case where a directional coupler 50 is used as the polarization coupler/splitter units 5a and 5b. As shown in FIG. 2, the polarization coupler/splitter units 5a and 5b include optical waveguides 51 and 52. The optical waveguide 51 includes a first port 51a, a curved waveguide 51b, a linear waveguide 51c, a curved waveguide 51d, and a third port 51e. The optical waveguide 52 includes a second port 52a, a curved waveguide 52b, and a linear waveguide 52c. Here, in the directional coupler 50 and the optical waveguides 51 and 52, the respective waveguides can be continuously connected to each other without having a discontinuous cross-section from a rectangular silicon waveguide.

The first port 51a is connected to the optical transmission unit 3a or the optical transmission unit 3b. The second port 52a is connected to the optical receiving unit 4a or the optical receiving unit 4b. The third port 51c is connected to the polarization-maintaining optical fiber 6.

The optical waveguides 51 and 52 are gently curved by the curved waveguides 51b and 52b so as to be come close to each other from the first port 51a and the second port 52a toward the linear waveguide 51c and the linear waveguide 52c. The linear waveguide 51c and the linear waveguide 52c are disposed in parallel to each other at a predetermined distance by which light can be selectively transitioned, and constitute the directional coupler 50. The optical waveguide 51 is gently curved by the curved waveguide 51d in a direction away from the optical waveguide 52 to the vicinity of the third port 51e and is connected to the polarization-maintaining optical fiber 6.

On the other hand, the optical waveguide 52 is gently curved in a direction away from the optical waveguide 51 and is terminated.

The TE mode launched from the optical transmission unit 3a or the optical transmission unit 3b is incident on the first port 51a. The TE mode incident from the first port 51a passes through the curved waveguide 51b, and penetrates into the polarization-maintaining optical fiber 6 through the linear waveguide 51c, the curved waveguide 51d, and the third port 51e without transitioning to the optical waveguide 52.

On the other hand, the TM mode traveling through the polarization-maintaining optical fiber 6 in a direction opposite to the traveling direction of the TE mode is incident on the third port 51b. The TM mode incident on the third port 51e passes through the curved waveguide 51d, and transitions from the linear waveguide 51c to the linear waveguide 52c within the directional coupler 50. The TM mode having transitioned to the linear waveguide 52c penetrates into the curved waveguide 52b. The TM mode having penetrated into the curved waveguide 52b is incident on the optical receiving unit 4a or the optical receiving unit 4b through the second port 52a.

That is, in the optical waveguide 51, light waves having two types of modes of the TM mode and the TE mode coexist from the third port 51e to the middle of the linear waveguide 51c.

Meanwhile, a mode converter which is not shown may be disposed between the third port 51e and the polarization-maintaining optical fiber 6 in order to adjust a mode field diameter.

Meanwhile, in a case of the optical waveguide, the TE mode has an effective refractive index higher than that of the TM mode, and thus the TM mode has a tendency to transition to that of the other mode. Therefore, in FIG. 2, a configuration is used in which the TM mode propagating through the optical waveguide 51 transitions to the optical waveguide 52. However, the directional coupler is not limited the configuration of FIG. 2, and can be appropriately designed so as to correspond to the types of optical transmission unit and optical receiving unit to be used. A configuration may be used in which the TE mode propagating through the optical waveguide 51 transitions to the optical waveguide 52, for example, by adjusting the conditions of an execution refractive index. In that case, a configuration may be used in which the TE mode is incident on the third port 51e and propagates through the optical waveguide 51.

In addition, in FIG. 2, both the optical waveguides 51 and 52 each have curved waveguides, but only one of the optical waveguides 51 and 52 may be provided with a curved waveguide to constitute the directional coupler 50.

Figure 3:
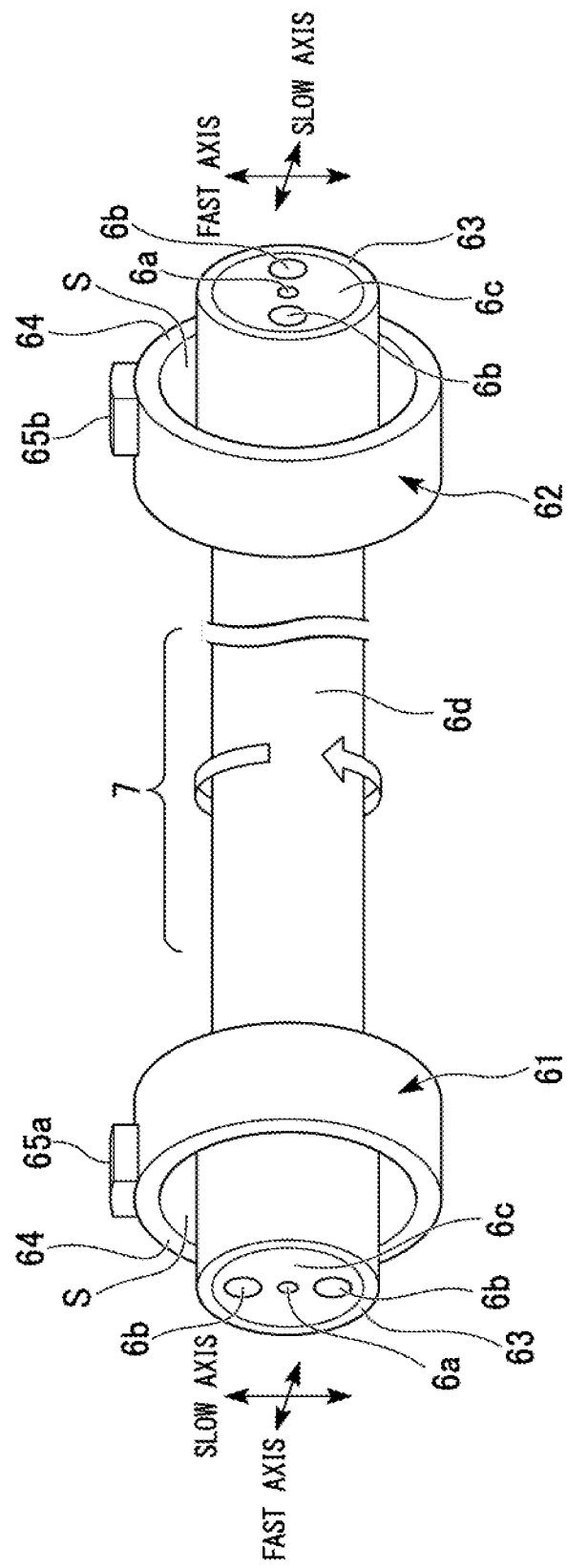
FIG. 3 is a diagram showing a configuration of a polarization-maintaining optical fiber and a polarization rotation unit of FIG. 1.

As shown in FIG. 3, the polarization-maintaining optical fiber 6 includes an optical fiber main body 6d, a connector key (first connector key) 65a, and a connector key (second connector key) 65b. The optical fiber main body 6d includes a core 6a, a pair of stress applying portions 6b, and a cladding 6c. In the optical fiber main body 6d, as shown in FIG. 3, the core 6a, the pair of stress applying portions 6b, and the cladding 6c extend throughout the entire length in a longitudinal direction.

Both ends of the core 6a are optically connected to the third port 51e of the polarization coupler/splitter units 5a and 5b through a connecting portion which is not shown.

A key ring 61 and a key ring 62 are disposed on both ends of the polarization-maintaining optical fiber 6, respectively. The key ring 61 includes a ferrule 63, a sheath 64, and a connector key 65a. The key ring 62 includes a ferrule 63, a sheath 64, and a connector key 65b. Thereby, the connector keys 65a and 65b are disposed on both ends of the polarization-maintaining optical fiber 6. The ferrule 63 is formed of ceramics such as zirconia, a metal or the like, and covers the outer circumference of the cladding 6c. The sheath 64 is formed of a metal or the like, and is formed so as to surround the outer circumference of the ferrule 63 with a space S interposed therebetween. The connector key 65a and 65b protrude from the outer circumferential surface of each sheath 64 toward the outer side in a radial direction. The connector key 65a and 65b are engaged with key grooves (not shown) included in the connecting portion of the optical waveguide devices 1a and 1b, and regulate the directions of slow axes on both ends of the polarization-maintaining optical fiber 6 with respect to the substrates 2a and 2b.

Meanwhile, the polarization-maintaining optical fiber 6 in the shown example is a PANDA type optical fiber of which the stress applying portion 6b has a substantially circular cross-section, but other types of polarization-maintaining optical fiber, for example, a bow-tie type optical fiber or an elliptic core type optical fiber can also be used.

Here, as shown in FIGS. 1 and 3, the polarization-maintaining optical fiber 6 of the present embodiment includes a polarization rotation unit 7 that changes the direction of the electric field plane of a light wave. The polarization rotation unit 7 is disposed at the optical fiber main body 6d of the polarization-maintaining optical fiber 6. The polarization rotation unit 7 in the present embodiment is formed by axially twisting the polarization-maintaining optical fiber 6 (optical fiber main body 6d). Thereby, the direction of the electric field plane of a light wave that is launched from the polarization rotation unit 7 is substantially orthogonal to the direction of the electric field plane of a light wave incident on the polarization rotation unit 7.

In the example shown in FIG. 1, the TE mode launched from the optical waveguide device 1a is converted into the TM mode by the polarization rotation unit 7 and is incident on the optical waveguide device 1b. In addition, the TE mode launched from the optical waveguide device 1b is converted into the TM mode by the polarization rotation unit 7 and is incident on the optical waveguide device 1a.

In addition, as shown in FIG. 3, the connector key 65a of the key ring 61 is disposed on the slow axis of the outer circumferential surface on the first end of the optical fiber 6. The connector key 65b of the key ring 62 is disposed on the fast axis of the outer circumferential surface on the second end of the optical fiber 6. Thereby, the connector keys 65a and 65b cause the direction of the slow axis of the optical fiber 6 with respect to the substrate 2a at the connecting portion to the optical waveguide device 1a and the direction of the slow axis of the optical fiber 6 with respect to the substrate 2b at the connecting portion to the optical waveguide device 1b to be substantially orthogonal to each other.

As described above, according to the bidirectional optical transmission apparatus 10 of the present embodiment, the direction of the slow axis of the polarization-maintaining optical fiber 6 with respect to the substrate 2a at the connecting portion to the optical waveguide device 1a and the direction of the slow axis of the polarization-maintaining optical fiber 6 with respect to the substrate 2b at the connecting portion to the optical waveguide device 1b are substantially orthogonal to each other. Therefore, when the optical transmission unit 3a launches the TE mode, a light wave incident on the optical receiving unit 4b is TM mode. Similarly, when the optical transmission unit 3b launches the TE mode, a light wave incident on the optical receiving unit 4a is TM mode. In this manner, it is possible to commonalize the directions of the electric field planes of the light waves incident on the optical receiving unit 4a and optical receiving unit 4b, while commonalizing the directions of the electric field planes of the light waves launched from the optical transmission unit 3a and the optical transmission unit 3b.

Thereby, since the optical transmission unit 3a and the optical transmission unit 3b can be commonalized, and the optical receiving unit 4a and the optical receiving unit 4b can be commonalized, it is possible to commonalize the configurations of transmission and receiving units in the configurations of the optical waveguide device 1a and the optical waveguide device 1b. Therefore, it is possible to realize the bidirectional optical transmission apparatus with a relatively simple configuration, and to realize a reduction in manufacturing cost and an improvement in maintenance.

Meanwhile, in the present embodiment, the transmission and receiving unit is assumed to have either configuration of the optical transmission unit 3a, the optical receiving unit 4a, and the polarization coupler/splitter unit 5a, or the optical transmission unit 3b, the optical receiving unit 4b, and the polarization coupler/splitter unit 5b, in the configuration of FIG. 1.

In addition, in the present embodiment, the use of the same substrate in the substrate 2a and 2b can allow the configurations of the optical waveguide device 1a and the optical waveguide device 1b to be commonalized. Therefore, the present embodiment is used, and thus it is possible to realize a bidirectional optical transmission apparatus with a relatively simple configuration. In addition, since the same substrate is used in the substrates 2a and 2b, the fabrication of the same transmission and receiving unit on the substrates 2a and 2b can allow the common optical waveguide device 1a and optical waveguide device 1b to be easily manufactured. In addition, it is possible to realize a reduction in manufacturing cost and an improvement in maintenance.

In addition, the optical fiber main body 6d is axially twisted between the optical waveguide device 1a and the optical waveguide device 1b, and thus the direction of the slow axes at the front and rear of this twisted portion can be caused to be substantially orthogonal to each other.

Thereby, the direction of the slow axis of the polarization-maintaining optical fiber 6 with respect to the substrate 2a at the connecting portion to the optical waveguide device 1a and the direction of the slow axis of the polarization-maintaining optical fiber 6 with respect to the substrate 2b at the connecting portion to the optical waveguide device 1b can be caused to be substantially orthogonal to each other with a simple configuration.

In addition, according to the polarization-maintaining optical fiber 6 of the present embodiment, the polarization rotation unit 7 disposed between the both ends changes the direction of the electric field plane of a light wave. Further, both ends of the polarization-maintaining optical fiber 6 are provided with the connector keys 65a and 65b. The connector keys 65a and 65b cause the direction of the slow axis of the polarization-maintaining optical fiber 6 with respect to the substrate 2a at the connecting portion to the optical waveguide device 1a and the direction of the slow axis of the polarization-maintaining optical fiber with respect to the substrate 2b at the connecting portion to the optical waveguide device 1b to be substantially orthogonal to each other.

Therefore, in a case where both ends of the polarization-maintaining optical fiber 6 are connected to the optical waveguide devices 1a and 1 b, and the optical transmission units 3a and 3b launch light waves in which the directions of electric field planes are the same as each other, the directions of the electric field planes of the light waves incident on the optical receiving units 4a and 4b become the same as each other. Thereby, the optical transmission units 3a and 3b launch light waves having the same directions of the electric field plane, and light waves having the same direction of the electric field plane are incident on the optical receiving units 4a and 4b.

As described above, since the optical transmission unit 3a and the optical transmission unit 3b can be commonalized, and the optical receiving unit 4a and the optical receiving unit 4b can be commonalized, it is possible to commonalize the configurations of the transmission and receiving units included in the optical waveguide device 1a and the optical waveguide device 1b. Therefore, it is possible to realize the bidirectional optical transmission apparatus with a relatively simple configuration, and to realize a reduction in manufacturing cost and an improvement in maintenance.

In addition, in the present embodiment, the use of the same substrate in the substrate 2a and 2b can allow the configurations of the optical waveguide device 1a and the optical waveguide device 1b to be commonalized. Therefore, the present embodiment is used, and thus it is possible to realize the bidirectional optical transmission apparatus with a relatively simple configuration. In addition, since the same substrate is used in the substrates 2a and 2b, the fabrication of the same transmission and receiving unit on the substrates 2a and 2b can allow the common optical waveguide device 1a and optical waveguide device 1b to be easily manufactured. In addition, it is possible to realize a reduction in manufacturing cost and an improvement in maintenance. In this manner, the polarization-maintaining optical fiber 6 of the present embodiment is used, and thus it is possible to easily realize the simplification of the configuration of the bidirectional optical transmission apparatus 10.

Figure 4:
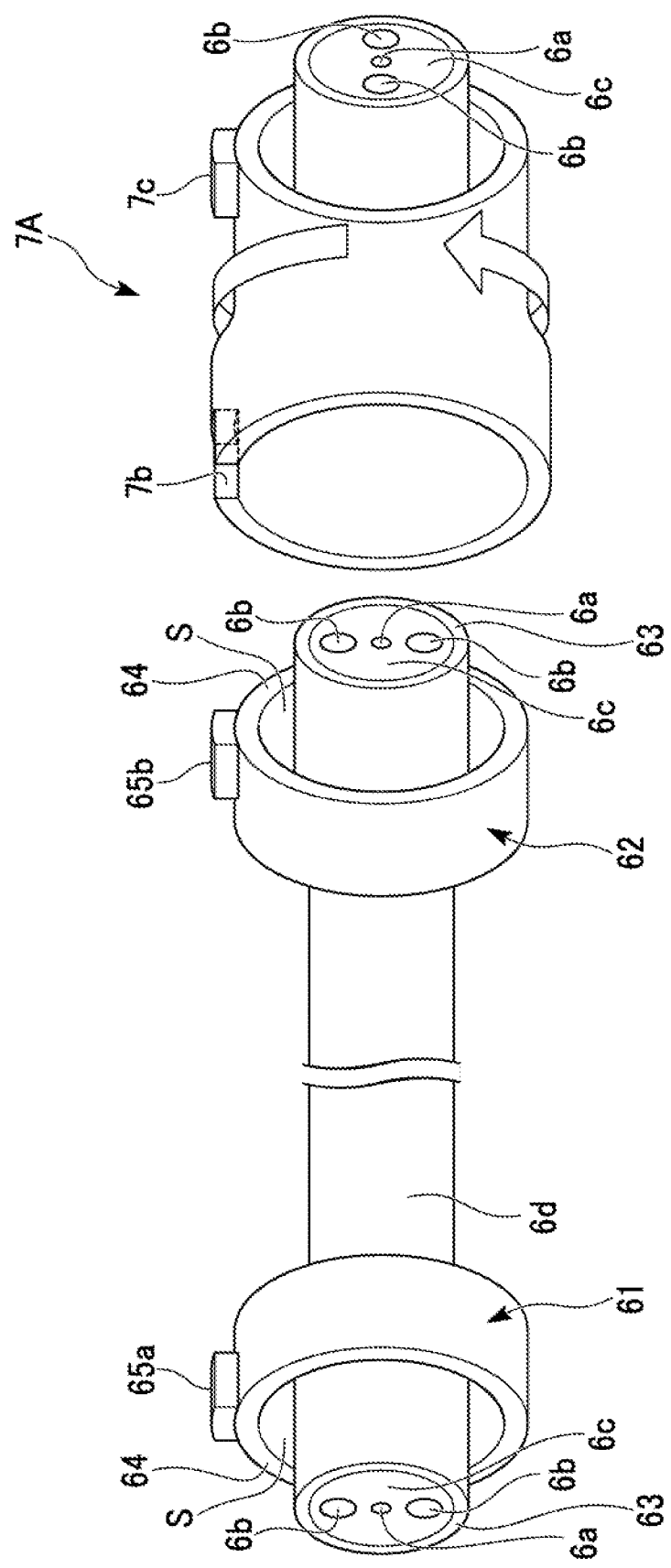
FIG. 4 is a diagram showing a modification example of the polarization-maintaining optical fiber and the polarization rotation unit of FIG. 3.

Meanwhile, the polarization-maintaining optical fiber 6 may include a polarization rotation element 7A shown in FIG. 4 as the polarization rotation unit 7. This polarization rotation element 7A can rotate the direction of the electric field plane of a light wave by 90°, and is disposed on one end of the polarization-maintaining optical fiber 6. A key groove 7b which is engaged with the connector key 65a or 65b is formed on one end of the polarization rotation element 7A. The end of the polarization rotation element 7A having the key groove 7b formed thereon is optically connected to the polarization-maintaining optical fiber 6. A connector key 7c similar to the connector key 65a and 65b is formed on the other end of the polarization rotation element 7A. The polarization-maintaining optical fiber 6 and the polarization rotation element 7A are connected to each other in a state where the directions of the slow axes are coincident with each other by the connector key 65a or 65b and the key groove 7b. The end of the polarization rotation element 7A having the connector key 7c formed thereon is optically connected to the optical waveguide device 1a or 1b.

Meanwhile, the polarization rotation element 7A may be mounted on one end of the polarization-maintaining optical fiber 6. Alternatively, the polarization rotation element 7A may be formed integrally with the polarization-maintaining optical fiber 6.

That is, in the present embodiment, a configuration is used in which the polarization rotation element 7A is added to one tip portion of the polarization-maintaining optical fiber 6. Thereby, it is possible to substantially realize a configuration in which the direction of the slow axis of the polarization-maintaining optical fiber 6 with respect to the substrate 2a and the direction of the slow axis of the polarization-maintaining optical fiber 6 with respect to the substrate 2b are substantially orthogonal to each other without twisting a general-purpose polarization-maintaining optical fiber 6. Therefore, a special fiber such as a short fiber in which the directions of connector keys on both ends are different from each other by 90 degrees is not required in order to be able to use the general-purpose polarization-maintaining optical fiber 6 as it is. In addition, from this, it is possible to realize the bidirectional optical transmission apparatus 10 excellent in maintenance such as the facilitation of work in which the polarization-maintaining optical fiber 6 is connected to the optical waveguide devices 1a and 1b, during a failure, during wire redrawing, and the like.

Second Embodiment

Next, a second embodiment will be described, but the basic configuration thereof is the same as that of the first embodiment. Therefore, the same components are denoted by the same reference numerals and signs, and a description thereof will not be given. Only points which are different therefrom will be described.

The present embodiment is different from the first embodiment, in that optical waveguide devices 1a and 1b include a plurality of transmission and receiving units.

Figure 5:
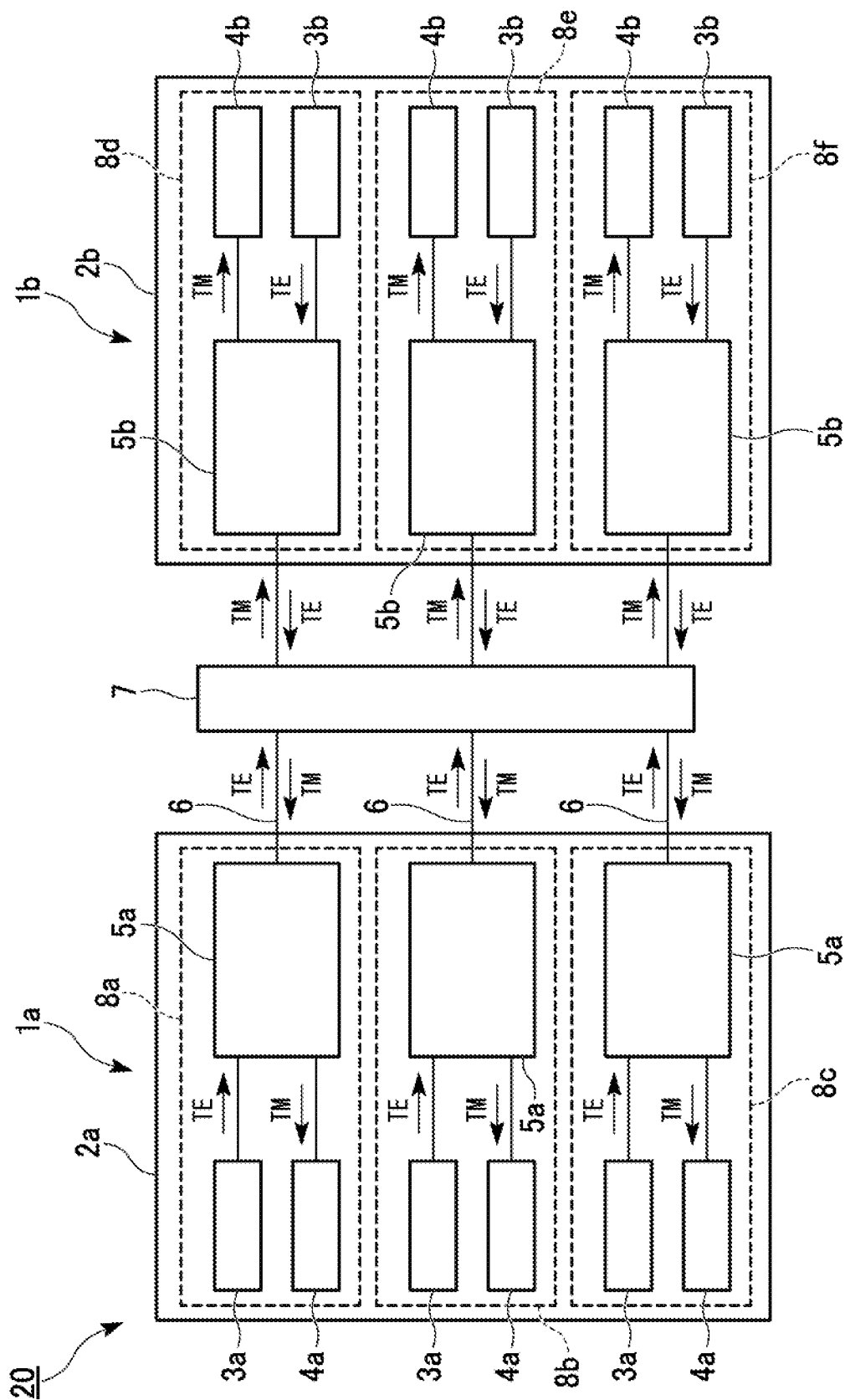
FIG. 5 is a diagram showing a configuration of a bidirectional optical transmission apparatus according to a second embodiment.

As shown in FIG. 5, a bidirectional optical transmission apparatus 20 of the present embodiment includes the optical waveguide devices 1a and 1b, a plurality of polarization-maintaining optical fibers 6, and a polarization rotation unit 7.

The optical waveguide device 1a includes a substrate 2a and a plurality of transmission and receiving units (first transmission and receiving units) 8a to 8c disposed on the substrate 2a. Each of the transmission and receiving units 8a to 8c includes an optical transmission unit 3a, an optical receiving unit 4a, and a polarization coupler/splitter unit 5a. Since components of the respective transmission and receiving units 8a to 8c are the same as each other, the transmission and receiving units 8a to 8c are the same as each other.

The optical waveguide device 1b includes a substrate 2b and a plurality of transmission and receiving units (second transmission and receiving units) 8d to 8f disposed on the substrate 2b. Each of the transmission and receiving units 8d to 8f includes an optical transmission unit 3b, an optical receiving unit 4b, and a polarization coupler/splitter unit 5b. Since components of the respective transmission and receiving units 8d to 8f are the same as each other, the transmission and receiving units 8d to 8f are the same as each other.

Figure 6:
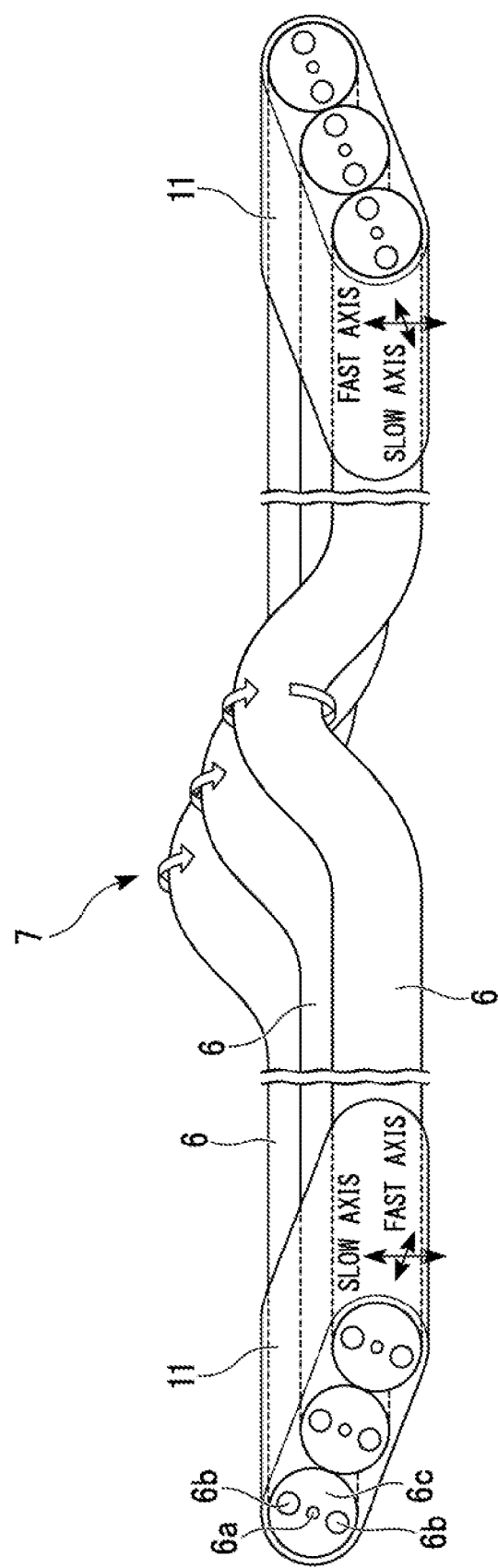
FIG. 6 is a diagram showing a configuration of a polarization-maintaining optical fiber and a polarization rotation unit of FIG. 5.

Meanwhile, in FIG. 5, one polarization rotation unit 7 linearly straddles three polarization-maintaining optical fibers 6. As shown in FIG. 6, this shows a structure in which three points having three polarization-maintaining optical fibers 6 twisted thereon by 90 degrees are lined up in a direction vertical to the longitudinal direction of the polarization-maintaining optical fiber 6. Here, the polarization rotation unit 7 is not limited to the structures shown in FIGS. 5 and 6. For example, three points having three polarization-maintaining optical fibers 6 twisted thereon by 90 degrees may not be lined up in a direction vertical to the longitudinal direction of the polarization-maintaining optical fiber 6.

As shown in FIG. 5, each of the plurality of polarization-maintaining optical fibers 6 separately connects the transmission and receiving units 8a to 8c and the transmission and receiving units 8d to 8f.

FIG. 6 is a diagram showing the plurality of polarization-maintaining optical fibers 6 shown in FIG. 5. As shown in FIG. 6, the plurality of polarization-maintaining optical fibers 6 is integrated in parallel with each other in a state of being twisted between both ends. As a method of integrating the plurality of polarization-maintaining optical fibers 6, the polarization-maintaining optical fibers 6 may be bonded or fixed to each other by a resin. Alternatively, as shown in FIG. 6, the ends of the plurality of polarization-maintaining optical fibers 6 may be fixed to each other by a tape 1l. Thereby, the both end of plurality of polarization-maintaining optical fibers 6 may be ribbon-shaped.

In a case where the plurality of polarization-maintaining optical fibers 6 are integrated in parallel with each other, it is preferable to form the polarization rotation unit 7 by twisting the respective polarization-maintaining optical fiber 6 by 90 degrees, for example, before the polarization-maintaining optical fibers 6 are integrated. In this case, the polarization-maintaining optical fibers 6 are extracted in an upward direction of FIG. 6, are twisted one by one, and are returned to positions before the extraction in a state where the twists are maintained. Next, the respective tip portions thereof are integrated. It is possible to reliably form the polarization rotation unit 7 by extracting and twisting the fibers in this manner.

In addition, the polarization rotation unit 7 may be formed by twisting the polarization-maintaining optical fibers 6 in a parallel state without being extracted.

Meanwhile, a plurality of polarization-maintaining optical fibers 6 including the polarization rotation element 7A as shown in FIG. 4, instead of the polarization rotation unit 7, on one end may be integrated in parallel with each other.

According to the bidirectional optical transmission apparatus 20 of the present embodiment, the plurality of polarization-maintaining optical fibers 6 that separately connect a plurality of transmission and receiving units 8a to 8f are integrated in parallel with each other while commonalizing the configurations of a plurality of transmission and receiving units 8a and 8f, and thus it is possible to provide the bidirectional optical transmission apparatus 20 which is excellent in installability and is capable of performing high-capacity communication.

Meanwhile, in the present embodiment, a case is shown in which each of the optical waveguide devices 1a and 1b includes three transmission and receiving units, but there is no limitation thereto. The optical waveguide devices 1a and 1b may each include two transmission and receiving units those are connected to each other by two polarization-maintaining optical fibers 6. Similarly, the optical waveguide devices 1a and 1b may each include four or more transmission and receiving units those are connected to each other by four or more polarization-maintaining optical fibers 6.

Third Embodiment

Next, a third embodiment will be described, but the basic configuration thereof is the same as that of the first embodiment. Therefore, the same components are denoted by the same reference numerals and signs, and a description thereof will not be given. Only points which are different therefrom will be described.

Figure 7:
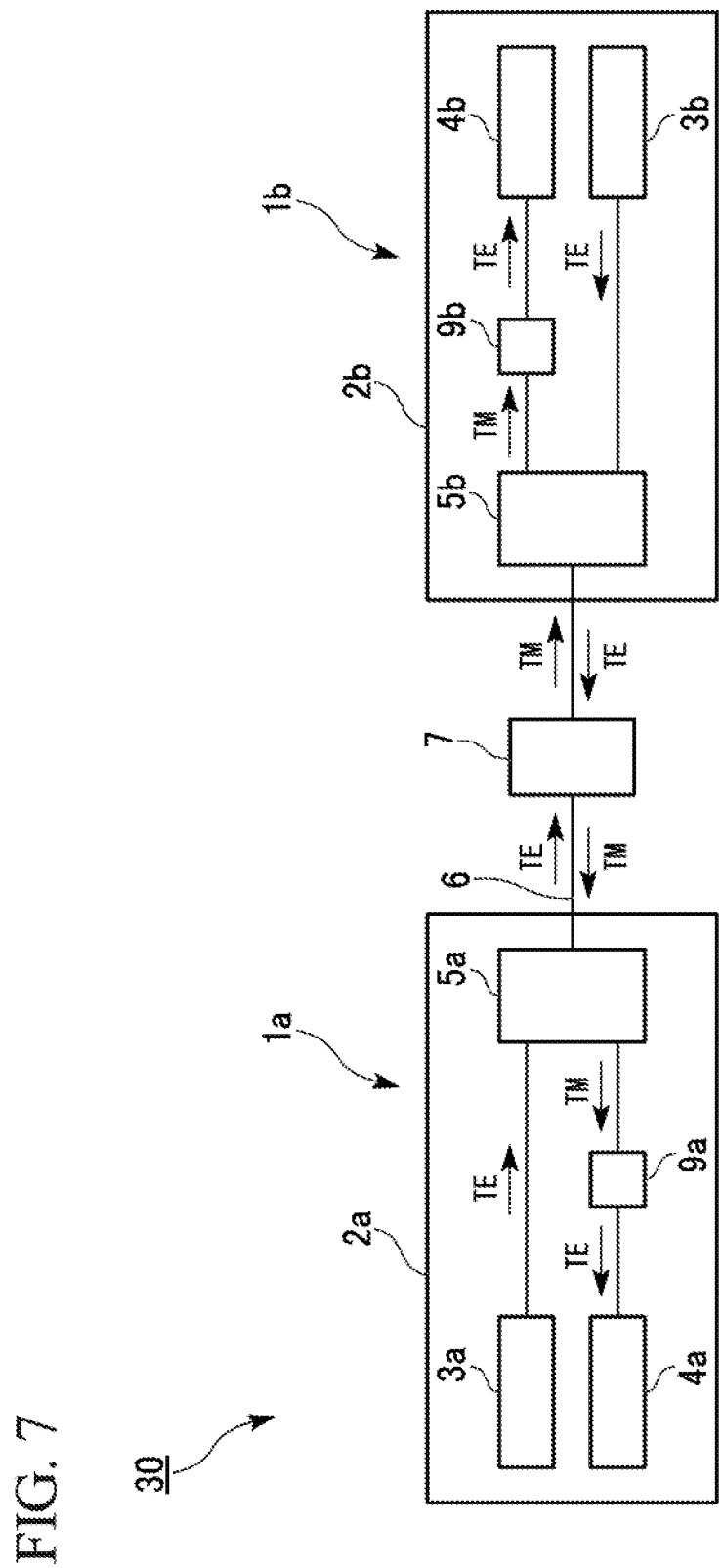
FIG. 7 is a diagram showing a configuration of a bidirectional optical transmission apparatus according to a third embodiment.

A bidirectional optical transmission apparatus 30 of the present embodiment is different from that of the first embodiment, in that optical waveguide devices 1a and 1b include polarization rotators 9a and 9b, respectively, as shown in FIG. 7.

The polarization rotators 9a and 9b change the direction of the electric field plane of a light wave. An example of the polarization rotators 9a and 9b capable of being used includes a polarization conversion element having a structure with a two-step height with respect to a silicon waveguide, as disclosed in PCT International Publication No. WO 2014/207949. As shown in FIG. 7, the polarization rotator 9a is connected to the polarization coupler/splitter unit 5a and the optical receiving unit 4a. The polarization rotator 9b is connected to the polarization coupler/splitter unit 5b and the optical receiving unit 4b. The TM mode launched from the polarization coupler/splitter units 5a and 5b are converted into TE mode by the polarization rotator 9a or 9b, and are incident on the optical receiving unit 4a or 4b.

According to the bidirectional optical transmission apparatus 30 of the present embodiment, for example, the light wave incident on the optical receiving units 4a and 4b can be converted from the TM mode to the TE mode. In a case where the light-receiving efficiency of the optical receiving units 4a and 4b is higher in the TE mode than in the TM mode, the polarization rotators 9a and 9b are used as in the present embodiment, and thus the TE mode having this high light-receiving efficiency can be caused to be incident on the optical receiving units 4a and 4b.

Meanwhile, the technical scope of the present invention is not limited to the embodiments, and can have various changes and modifications added thereto without departing from the spirit or scope of the present invention.

For example, in the above-described first to third embodiments, the connector keys 65a and 65b protrude from the outer circumferential surface of the sheath 64 toward the outer side in a radial direction, but the present invention is not limited thereto. For example, concave portions recessed from the outer circumferential surface of the sheath 64 toward the radial inner side thereof may be used as the connector keys 65a and 65b. In this case, the optical waveguide devices 1a and 1b may include a convex portion that regulates the direction of the slow axis with respect to the substrates 2a and 2b in engagement with the connector keys 65a and 65b which are concave portions.

In addition, in the above-described first to third embodiments, the polarization rotation unit 7 is formed by twisting the polarization-maintaining optical fiber 6, but the present invention is not limited thereto. For example, the polarization rotators 9a and 9b may be used as the polarization rotation unit 7.

In addition, in the above-described first to third embodiments, the polarization rotation unit 7 is disposed between both ends of the polarization-maintaining optical fiber 6, but the present invention is not limited thereto. For example, the polarization rotation unit 7 may be disposed between one end of the polarization-maintaining optical fiber 6 and an optical waveguide device that is connected to this end.

In addition, in the above-described first to third embodiments, the polarization rotation unit 7 is formed using the single-core polarization-maintaining optical fiber 6, but the present invention is not limited thereto, and a polarization-maintaining multicore optical fiber 6A may be used.

In this case, it is preferable to use optical fiber 6A which includes cores 6a1 to 6a4 as shown in FIG. 8 in order to use a common optical waveguide device on the transmission side (first optical waveguide device) and the receiving side (second optical waveguide device). That is, in a case where the optical fiber 6A is rotated by 90° around the axis of the optical fiber 6A, it is preferable to use a configuration in which four cores 6a1 to 6a4 are disposed so that the same core is present at a corresponding position, and all the light waves on the transmission side have the same polarization state. The cores 6a1 to 6a4 are disposed in this manner, and thus it is possible to apply the present invention even in a case where the polarization-maintaining multicore optical fiber is used, and to use a common optical waveguide device on the receiving side and the transmission side.

In addition, in a case where the polarization maintaining multicore optical fiber 6A is used in order to optically connect the plurality of transmission and receiving units, for example, as shown in FIG. 5, the polarization modes of light propagating through a waveguide split by the polarization coupler/splitter unit between the transmission and receiving units adjacent to each other are configured to be different from each other. Therefore, it is possible to reduce the influence of crosstalk between the transmission and receiving units adjacent to each other. Therefore, it is possible to dispose the transmission and receiving units adjacent to each other at a shorter distance.

Meanwhile, in FIG. 8, the stress applying portion is not shown. In addition, FIG. 8 shows a case where the number of cores is four. However, when each core is configured to be present at a position corresponding to a case where the optical fiber 6A is rotated by 90°, the number of cores may be a multiple of four such as eight or twelve.

In addition, in FIG. 8, when a direction along the outward shape of the polarization-maintaining optical fiber 6A is set to a circumferential direction, and a direction toward the center of the polarization-maintaining optical fiber 6A is set to a radial direction, the fast axis of each core is disposed along the circumferential direction, and the slow axis of each core is disposed along the radial direction.

Besides, the components in the above-described embodiments can be appropriately replaced with well-known components without departing from the spirit and scope of the present invention. In addition, the above-described embodiments and modification examples may be appropriately combined.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A bidirectional optical transmission apparatus comprising:
   a first optical waveguide device which comprises a first transmission and receiving unit that includes at least a first optical transmission unit, a first optical receiving unit, and a first polarization coupling-and-splitting unit, the first polarization coupling-and-splitting unit being connected to the first optical transmission unit and the first optical receiving unit, the first polarization coupling-and-splitting unit being configured to couple and split light waves in different polarization states from each other, the first transmission and receiving unit being disposed on a first substrate;
   a second optical waveguide device which comprises a second transmission and receiving unit that includes at least a second optical transmission unit, a second optical receiving unit, and a second polarization coupling-and-splitting unit, the second polarization coupling-and-splitting unit being connected to the second optical transmission unit and the second optical receiving unit, the second polarization coupling-and-splitting unit being configured to couple and split light waves in different polarization states from each other, the second transmission and receiving unit being disposed on a second substrate; and
   a polarization-maintaining optical fiber that connects the first optical waveguide device and the second optical waveguide device,
   wherein a direction of a slow axis of the polarization-maintaining optical fiber with respect to the first substrate at a connecting portion between the first optical waveguide device and the polarization-maintaining optical fiber and a direction of the slow axis of the polarization-maintaining optical fiber with respect to the second substrate at a connecting portion between the second optical waveguide device and the polarization-maintaining optical fiber are substantially orthogonal to each other, and wherein a direction, with respect to the first substrate, of an electric field plane of a light wave launched from the first optical transmission unit is substantially the same as a direction, with respect to the second substrate, of an electric field plane of a light wave launched from the second optical transmission unit.

2. The bidirectional optical transmission apparatus according to claim 1, wherein the polarization-maintaining optical fiber is axially twisted between the first optical waveguide device and the second optical waveguide device.

3. The bidirectional optical transmission apparatus according to claim 1, wherein the polarization-maintaining optical fiber comprises a polarization rotation element which is disposed on one end of the polarization-maintaining optical fiber, and which is configured to rotate in a direction of an electric field plane of the light wave.

4. The bidirectional optical transmission apparatus according to claim 1, further comprising a plurality of the polarization-maintaining optical fibers, wherein the first optical waveguide device includes at least a plurality of the first transmission and receiving units disposed on the first substrate, the second optical waveguide device includes at least a plurality of the second transmission and receiving units disposed on the second substrate, and the plurality of polarization-maintaining optical fibers separately connect the plurality of the first transmission and receiving units and the plurality of the second transmission and receiving units, and the plurality of polarization-maintaining optical fibers are integrated in parallel with each other.

5. The bidirectional optical transmission apparatus according to claim 1, wherein the polarization-maintaining optical fiber includes a key ring and a polarization rotation element, the key ring provided with a connector key, the polarization rotation element provided with a key groove which is engaged with the connector key, wherein the polarization rotation element is disposed between the key ring and the second transmission and receiving unit.

* * * * *